US012763892B2

(12) United States Patent
Tian

(10) Patent No.: US 12,763,892 B2
(45) Date of Patent: Oct. 13, 2026

(54) INFORMATION SENDING METHOD, INFORMATION RECEIVING METHOD, APPARATUS, DEVICE, AND MEDIUM FOR CHANNEL STATE INFORMATION FEEDBACK

(71) Applicant: GUANGDONG OPPO MOBILE TELECOMMUNICATIONS CORP., LTD., Dongguan (CN)

(72) Inventor: Wenqiang Tian, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 498 days.

(21) Appl. No.: 18/350,180

(22) Filed: Jul. 11, 2023

(65) Prior Publication Data

US 2023/0353300 A1 Nov. 2, 2023

Related U.S. Application Data

(63) Continuation of application No. PCT/CN2021/071536, filed on Jan. 13, 2021.

(51) Int. Cl.
*H04L 5/00* (2006.01)

(52) U.S. Cl.
CPC .................................. *H04L 5/0044* (2013.01)

(58) Field of Classification Search
CPC ... H04L 5/0044; H04L 1/0026; H04L 1/0027; H04L 1/0029; H04L 5/0057; H04L 5/0055; H04B 7/0641
See application file for complete search history.

(56) References Cited

U.S. PATENT DOCUMENTS

2011/0019637 A1* 1/2011 Ojala .................... H04L 1/0026 370/329
2017/0294950 A1 10/2017 Kim et al.
(Continued)

FOREIGN PATENT DOCUMENTS

| | | |
|---|---|---|
| CN | 110582957 | 12/2019 |
| CN | 112019314 | 12/2020 |
| WO | 2018202134 | 11/2018 |

OTHER PUBLICATIONS

Huawei et al., "CSI feedback enhancements," 3GPP TSG RAN WG1 Meeting #103-e, R1-2007566, Oct. 2020.
(Continued)

*Primary Examiner* — Thomas R Cairns
*Assistant Examiner* — Raenita Ann Fenner
(74) *Attorney, Agent, or Firm* — Hodgson Russ LLP

(57) ABSTRACT

The present application discloses an information sending method, an information receiving method, apparatus, ad device, and a storage medium, which relate to the technical field of mobile communications. The information sending method is applied to a first node in a mobile communication system, and the method comprises: sending supplementary feedback information to a second node in a mobile communication system, the supplementary feedback information being used to incrementally update complete channel information, or the supplementary feedback information being used to predict the complete channel information. Said method may reduce feedback overhead while ensuring a CSI feedback effect.

13 Claims, 5 Drawing Sheets

(56) References Cited

U.S. PATENT DOCUMENTS

| | | | | |
|---|---|---|---|---|
| 2018/0323835 | A1 | 11/2018 | Wang et al. | |
| 2020/0059282 | A1* | 2/2020 | Wu | H04B 7/0626 |
| 2022/0132516 | A1* | 4/2022 | Hwang | H04W 24/10 |
| 2024/0080862 | A1* | 3/2024 | Garcia | H04L 5/0057 |

OTHER PUBLICATIONS

Wen et al., "Deep Learning for Massive MIMO CSI Feedback," IEEE Wireless Communications Letters, Oct. 2018, vol. 7, No. 5.

"3rd Generation Partnership Project; Technical Specification Group Radio Access Network; NR; Physical layer procedures for control (Release 16)," 3GPP TS 38.213, Sep. 2020, v16.3.0.

"3rd Generation Partnership Project; Technical Specification Group Radio Access Network; NR; Physical layer procedures for data (Release 16)," 3GPP TS 38.214, Sep. 2020, v16.3.0.

"3rd Generation Partnership Project; Technical Specification Group Radio Access Network; NR; Physical channels and modulation (Release 16)," 3GPP TS 38.211, Sep. 2020, v16.3.0.

WIPO, International Search Report and Written Opinion for PCT/CN2021/071536, Oct. 20, 2021.

EPO, Extended European Search Report for EP Application No. 21918278.9, Mar. 4, 2024.

* cited by examiner

INFORMATION SENDING METHOD, INFORMATION RECEIVING METHOD, APPARATUS, DEVICE, AND MEDIUM FOR CHANNEL STATE INFORMATION FEEDBACK

CROSS-REFERENCE TO RELATED APPLICATIONS

This application is a continuation of International Application No. PCT/CN2021/071536, filed Jan. 13, 2021, the entire disclosure of which is incorporated herein by reference.

TECHNICAL FIELD

The present disclosure relates to the field of mobile communication, and more particularly, to a method for sending information, a method for receiving information, an apparatus, a device, and a medium.

BACKGROUND

Channel-State Information (CSI) indication is very important in Long Term Evolution (LTE) systems and New Radio (NR) systems, which determines a Multiple-Input Multiple-Output (MIMO) transmission performance.

In the related art, the CSI indication in the systems may include indication for information such as a Channel Quality Indicator (CQI), a Precoding Matrix Indicator (PMI), and a Rank indicator (RI). From a process point of view, a base station may first configure indication parameter information for the CSI indication, for example, about which information among the CQI, the PMI, the RI, and other information that needs to be indicated for a User Equipment (UE). In addition, the base station may configure some reference signals for CSI measurement, such as Channel-State Information Reference Signal (CSI-RS). Through measurement of the reference signal, the UE determines the condition about the current channel state information and determines the indication parameter information to indicate current channel state information to the base station. Thus, the base station may configure a reasonable and efficient data transmission mode based on the current channel condition.

According to a method in the related art, the overhead involved in feeding back the channel state information is relatively large.

SUMMARY

Embodiments of the present disclosure provide a method for sending information, a method for receiving information, an apparatus, a device, and a medium, which can reduce the feedback overhead while ensuring the CSI feedback effect. The technical solutions are as follows.

According to an aspect of the present disclosure, there is provided a method for sending information, which is applied to a first node in a mobile communication system, and the method includes:

sending supplementary feedback information to a second node in the mobile communication system, where the supplementary feedback information is used for incrementally updating complete channel information, or the supplementary feedback information is used for predicting the complete channel information.

According to an aspect of the present disclosure, there is provided a method for receiving information, which is applied to a second node in a mobile communication system, and the method includes:

receiving supplementary feedback information sent by a first node in the mobile communication system, where the supplementary feedback information is used for incrementally updating complete channel information, or the supplementary feedback information is used for predicting the complete channel information.

According to an aspect of the present disclosure, there is provided an apparatus for sending information, which is applied to a first node in a mobile communication system, and the apparatus includes:

a first sending module, configured to send supplementary feedback information to a second node in the mobile communication system, where the supplementary feedback information is used for incrementally updating complete channel information, or the supplementary feedback information is used for predicting the complete channel information.

According to an aspect of the present disclosure, there is provided an apparatus for receiving information, which is applied to a second node in a mobile communication system, and the apparatus includes:

a second receiving module, configured to receive supplementary feedback information sent by a first node in the mobile communication system, where the supplementary feedback information is used for incrementally updating complete channel information, or the supplementary feedback information is used for predicting the complete channel information.

According to an aspect of the present disclosure, there is provided a terminal, including: a processor, a transceiver connected to the processor, and a memory configured to store executable instructions for the processor. The processor is configured to load and execute the executable instructions to perform the method for sending information and/or the method for receiving information as described in the above aspects.

According to an aspect of the present disclosure, there is provided a network device, including: a processor, a transceiver connected to the processor, and a memory configured to store executable instructions for the processor. The processor is configured to load and execute the executable instructions to perform the method for sending information and/or the method for receiving information as described in the above aspects.

According to an aspect of the present disclosure, there is provided a computer-readable storage medium having executable instructions stored thereon, where the executable instructions are loaded and executed by a processor to perform the method for sending information and/or the method for receiving information as described in the above aspects.

According to an aspect of the present disclosure, there is provided a chip, including a programmable logic circuit or a program, where the chip is configured to implement the method for sending information and/or the method for receiving information as described in the above aspects.

According to an aspect of the present disclosure, there is provided a computer program product. The computer program product, when running on a processor of a computer device, causes the computer device to perform the method for sending information and/or the method for receiving information as described in the above aspects.

The technical solutions provided by embodiments of the present disclosure at least include the following beneficial effects.

By sending the supplementary feedback information, the first node in the mobile communication system enables the second node to update or predict the complete channel information according to the supplementary feedback information, thereby acquiring new complete channel information. This helps to reduce the feedback overhead while ensuring the CSI feedback effect of the mobile communication system.

BRIEF DESCRIPTION OF THE DRAWINGS

In order to explain technical solutions in embodiments of the present disclosure more clearly, drawings needed in the description of these embodiments will be briefly introduced below. Obviously, the drawings in the following description are only some embodiments of the present disclosure. For those of ordinary skill in the art, other drawings can be obtained from these drawings without creative labor.

DETAILED DESCRIPTION

In order to make objectives, technical solutions, and advantages of the present disclosure clearer, implementations of the present disclosure will be further described in detail below with reference to the drawings.

First of all, nouns involved in embodiments of the present disclosure are briefly introduced.

Channel State Information (CSI)

CSI is information for describing a channel property of a communication link. CSI indication is very important in communication systems, which determines a Multiple-Input Multiple-Output (MIMO) transmission performance. Generally speaking, the CSI indication in the communication systems may include indication for information such as a Channel Quality Indicator (CQI), a Precoding Matrix Indicator (PMI), and a Rank indicator (RI).

Figure 1:
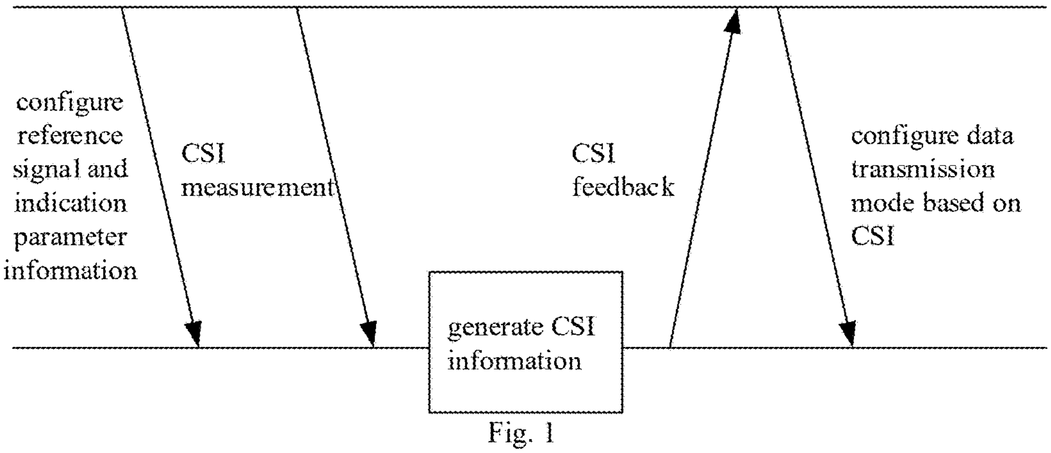
FIG. 1 is a schematic diagram of a process of generating and indicating channel state information provided by an exemplary embodiment of the present disclosure.

With reference to FIG. 1, the way for generating and indicating the CSI is exemplarily described. As shown in FIG. 1, from a process point of view, a network device may first configure indication parameter information for the CSI indication, for example, about which information among the CQI, the PMI, the RI and other information that needs to be indicated for a terminal. In addition, the terminal may configure some reference signals for CSI measurement, such as a Synchronization Signal Block (SSB) and/or a Channel State Information-Reference Signal (CSI-RS). Through measurement of the reference signal, the terminal determines the condition about the current channel state information and determines the indication parameter information to indicate the current channel state information to the base station. Thus, the network device may configure a reasonable and efficient data transmission mode based on the current channel condition.

Artificial Intelligence (AI)

In recent years, artificial intelligence researches represented by neural networks have made great achievements in many fields, which will also expose an important effect in production and life of peoples for a long time in the future.

Figure 2:
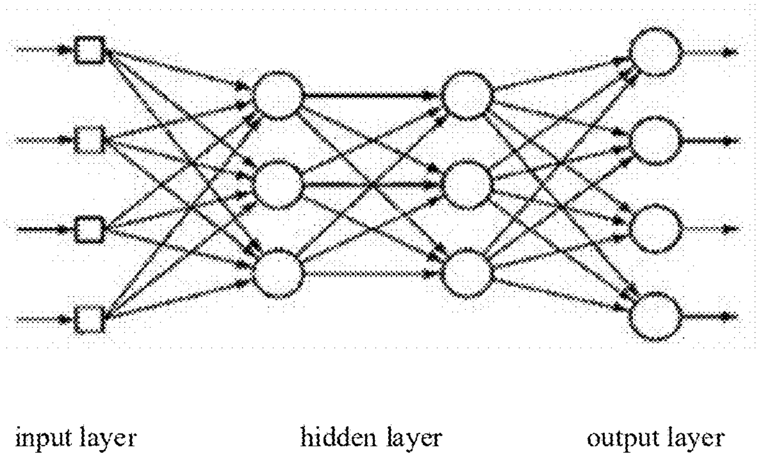
FIG. 2 is a schematic diagram of a neural network provided by an exemplary embodiment of the present disclosure.
Figure 3:
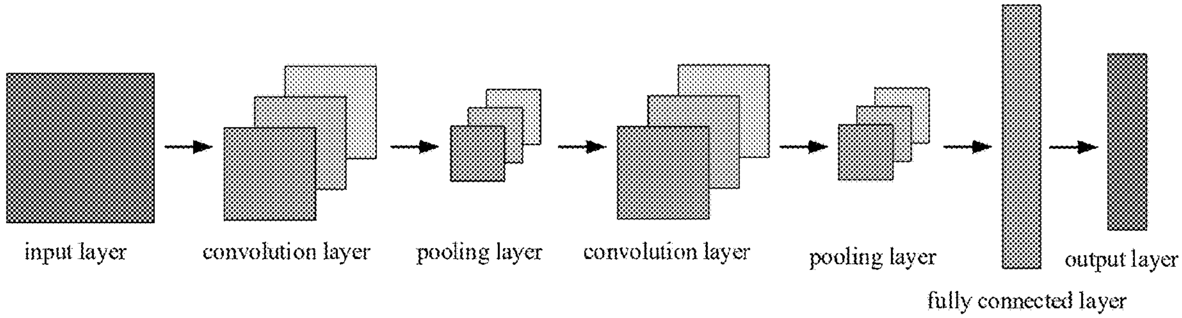
FIG. 3 is a schematic diagram of a convolutional neural network provided by an exemplary embodiment of the present disclosure.

Reference is made to FIG. 2, which shows a schematic diagram of a neural network provided by an embodiment of the present disclosure. As shown in FIG. 2, a basic structure of a simple neural network includes: an input layer, a hidden layer, and an output layer. The input layer receives data, the hidden layer processes the data, and the final result is generated in the output layer. As shown in FIG. 3, each node represents a processing unit, which may be considered as simulating a neuron. Multiple neurons form a layer of neural network, and information transmission and processing on the multiple layers construct a whole neural network.

With the continuous development of neural network researches, in recent years, neural network deep learning algorithms have been proposed, and more hidden layers have been introduced. Feature learning is performed through layer-by-layer training of the neural network with multiple hidden layers, which greatly improves the learning and processing capabilities of the neural network, and is widely used in applications such as pattern recognition, signal processing, optimized combination, and anomaly detection.

In addition, with the development of deep learning, convolutional neural networks have been further studied. Reference is made to FIG. 3, which shows a schematic diagram of a convolutional neural network provided by an embodiment of the present disclosure. As shown in FIG. 3, the basic structure of a convolutional neural network includes: an input layer, multiple convolutional layers, multiple pooling layers, a fully connected layer, and an output layer. The introduction of the convolutional layers and the pooling layers effectively controls a sharp increase of network parameters, limits the number of parameters, and mines the characteristics of local structures, thereby improving robustness of the algorithm.

Use of Neural Network for Indicating Channel State Information

Most of basic principles of current mobile communication system are based on theoretical modeling and parameter selection for an actual communication environment. With the further enhancement of requirements for the mobile communication system such as flexibility, adaptability, rate, and capacity, the gain that can be brought by the traditional operation mode of the mobile communication system based on classical model theories is gradually weakening. At present, some new studies aimed at the above problems have been gradually carried out, and the use of artificial intelligence to acquire and indicate CSI is one of these studies.

Figure 4:
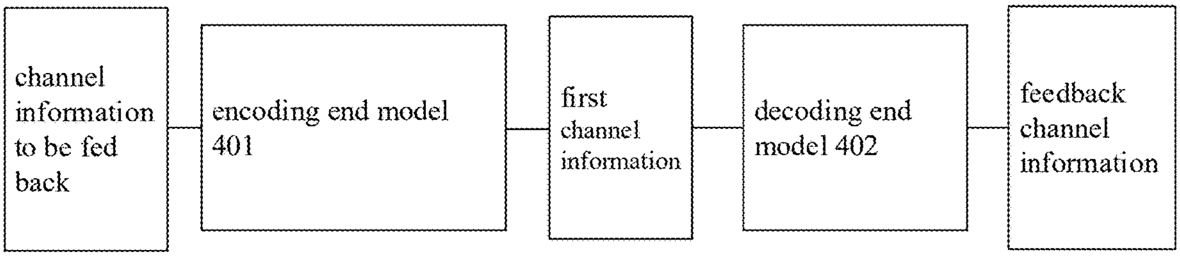
FIG. 4 is a schematic diagram of a network architecture for indicating channel state information by using a neural network model provided by an exemplary embodiment of the present disclosure.

Reference is made to FIG. 4, which shows a basic network architecture for indicating channel state information by using a neural network model. According to this type of method, firstly, an encoding end (a first node) generates, through an encoding model 401, first channel information from channel information to be fed back for indication of channel state information; and a decoding end (a second node) generates, through a decoding model 402, feedback channel information from the first channel information for recovery of channel quality information.

Figure 5:
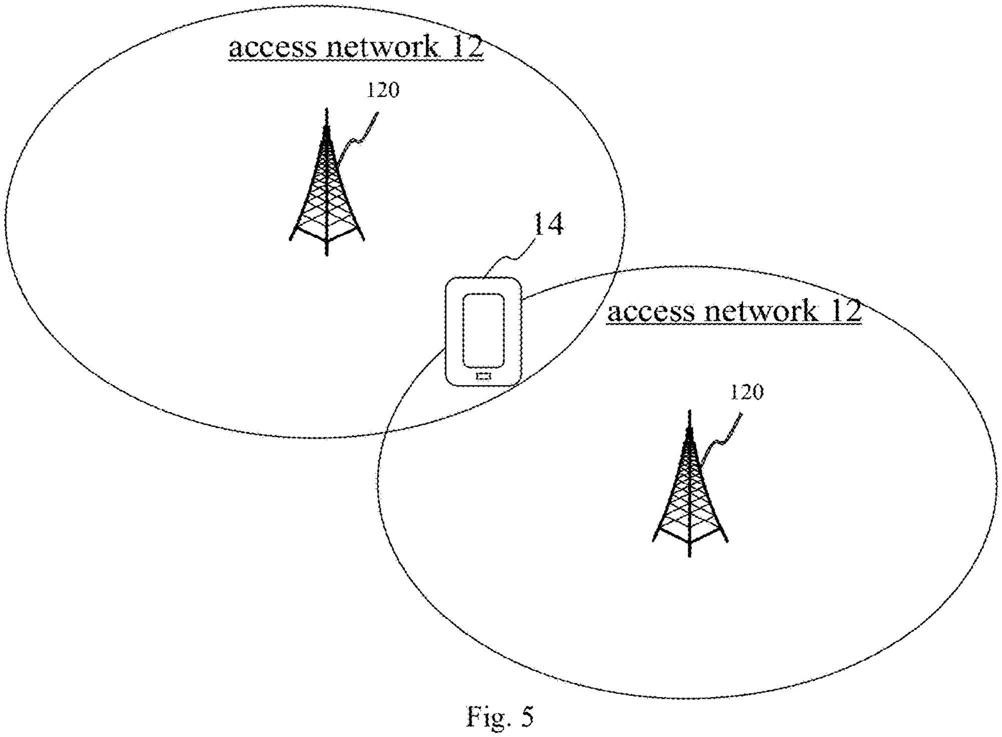
FIG. 5 is a block diagram of a communication system provided by an exemplary embodiment of the present disclosure.

FIG. 5 shows a block diagram of a communication system provided by an exemplary embodiment of the present disclosure, and the communication system may include an access network 12 and a terminal device 14.

The access network 12 includes several network devices 120. The network device 120 may be a base station, and the base station is a device deployed in the access network to provide the terminal with a wireless communication function. The base station may include various forms of macro base stations, micro base stations, relay stations, access points, and so on. In systems adopting different radio access technologies, names of devices with base station functions may be different. For example, in the LTE system, it is called eNodeB or eNB; and in the 5G NR-U system, it is called gNodeB or gNB. As the communications technologies evolve, the description “base station” may change. For the convenience of embodiments of the present disclosure, the foregoing devices that provide wireless communication functions for the terminal device 14 are collectively referred to as network devices.

The terminal device 14 may include various handheld devices with wireless communication functions, vehicle-mounted devices, wearable devices, computing devices, or other processing devices connected to wireless modems, as well as various forms of user equipment, Mobile Stations (MS), terminal devices, and so on. For the convenience of description, the devices mentioned above are collectively referred to as terminals. The network device 120 and the terminal device 14 communicate with each other through a certain air interface technology, such as a Uu interface.

The technical solutions in embodiments of the present disclosure are applicable to various communication systems, for example, a Global System Of Mobile Communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD) system, an advanced Long Term Evolution (LTE-A) system, a New Radio (NR) system, an evolved system of the NR system, an LTE-based access to Unlicensed spectrum (LTE-U) system, a NR-U system, a Universal Mobile Telecommunication System (UMTS), a Worldwide Interoperability for Microwave Access (WiMAX) communication system, a Wireless Local Area Networks (WLAN), Wireless Fidelity (WiFi), a 6th-Generation (6G) communication system, a next generation communication system, or other communication systems.

Generally speaking, a conventional communication system supports a limited number of connections and therefore is easy to implement. However, with development of the communication technology, a mobile communication system will not only support conventional communication, but also support, for example, Device to Device (D2D) communication, Machine to Machine (M2M) communication, Machine Type Communication (MTC), Vehicle to Vehicle (V2V) communication, and a Vehicle to Everything (V2X) system, etc. Embodiments of the present disclosure may also be applied to these communication systems.

Figure 6:
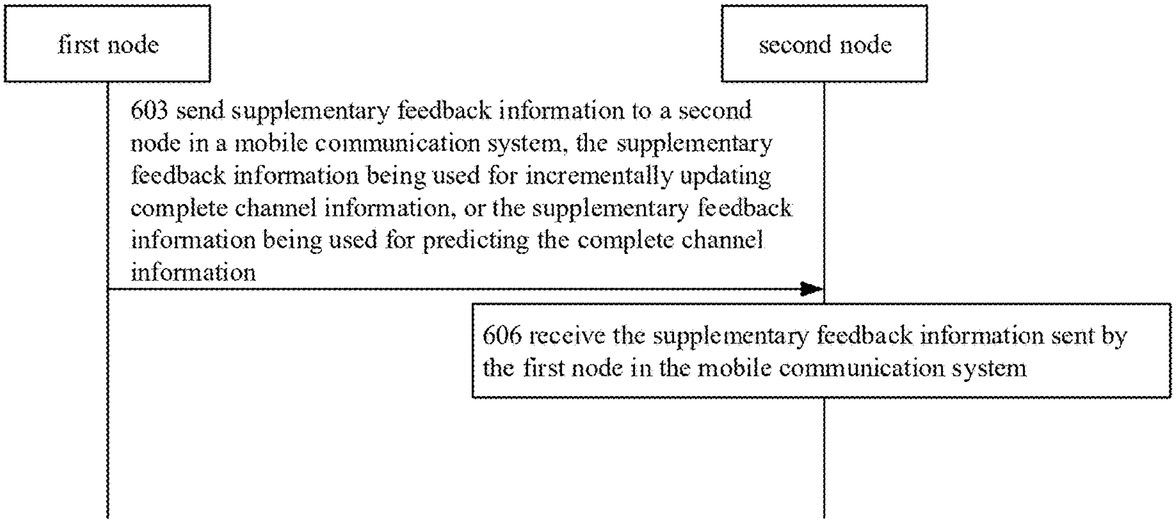
FIG. 6 is a flowchart of an information transmission method provided by an exemplary embodiment of the present disclosure.

FIG. 6 shows a flowchart of an information transmission method provided by an exemplary embodiment of the present disclosure. The method includes sending information and receiving information. The above method being applied to a mobile communication system is taken as an example for illustration in embodiments of the present disclosure. The mobile communication system includes a first node and a second node. The method includes the following steps 603 and 606.

In the step 603, supplementary feedback information is sent to a second node in the mobile communication system. The supplementary feedback information is used for incrementally updating complete channel information, or the supplementary feedback information is used for predicting the complete channel information.

The complete channel information is used for describing a channel quality condition about a total content of a channel. Exemplarily, the complete channel information is channel information about a channel at a certain time, for example, a quality condition about a channel in a particular time domain or a particular space domain. The complete channel information is used for describing a channel quality condition about a channel. The complete channel information is used for describing the quality condition about the channel in the time domain, the frequency domain, an antenna dimension, and an incident angle. For example, the complete channel information may be CSI.

The supplementary feedback information is information acquired according to the increment (variation) in complete channel information. Alternatively, the supplementary feedback information is information for predicting future complete channel information according to a change trend of the complete channel information.

Exemplarily, the complete channel information may change over time. According to the method in the related art, the first node needs to synchronize the complete channel information at the current time with the second node in real time, and the feedback overhead involved in this channel information feedback method is excessive. Therefore, the present disclosure provides the supplementary feedback information, which may be two types of information.

For a first type, the supplementary feedback information is used for representing the increment in complete channel information. For example, the complete channel information at time t is first channel information, and the complete channel information at time t+1 (the current time) is second channel information. If there are only a few values that change between the second channel information and the first channel information, the supplementary feedback information may be used for representing the difference between the second channel information and the first channel information. After receiving the supplementary feedback information, the second node may acquire the complete channel information at time t+1 (that is, the second channel information) according to the complete channel information at time t (that is, the first channel information). Thereby, it is ensured that the second node can acquire the complete channel information while reducing the feedback overhead involved in the channel information feedback.

For a second type, the supplementary feedback information is used for representing the prediction for the complete channel information. Exemplarily, the first node may predict a change trend (increment) of the complete channel information, or predict the future complete channel information. For example, the first node predicts a change of the complete channel information between a future time and the current time according to the change trend of the complete channel information in the past period of time. The first node sends the supplementary feedback information to the second node, so that the second node can acquire the complete channel information at the future time according to the supplementary feedback information and the complete channel information at the current time. For another example, the first node predicts the complete channel information at the future time (that is, acquiring the supplementary feedback information) according to the complete channel information in the past period of time, and sends the supplementary feedback information to the second node, so that the second node acquires the complete channel information at the future time.

Exemplarily, the complete channel information may be data that is independently used, and the complete channel information may independently indicate the channel quality condition about the channel. It is needed to combine the supplementary feedback information with the complete channel information at one time for acquiring the complete channel information at another time. Then, the newly acquired complete channel information is used for indicating the channel quality condition about the channel. The supplementary feedback information cannot be used alone for describing the channel quality condition about the channel.

In the mobile communication system, there are several network devices and several terminals, and both the network devices and the terminals may be used as the first nodes or the second nodes. Exemplarily, the first node is one of the network device and the terminal; and the second node is one of the network device and the terminal. For example, the first node is a network device, and the second node is a terminal. For another example, the first node is a terminal, and the second node is a network device. For still another example, the first node is a first terminal, and the second node is a second terminal. For yet another example, the first node is a first network device, and the second node is a second network device.

According to different types of nodes, transmission modes in which the first node sends the supplementary feedback information to the second node are also different, which may be grouped into the following optional transmission modes.

In an embodiment, the first node is the terminal device, the second node is the network device, and the supplementary feedback information is carried in at least one of. Uplink Control Information (UCI), a Physical Uplink Control Channel (PUCCH), a Physical Uplink Shared Channel (PUSCH), a RRC message, and data information.

In an embodiment, both the first node and the second node are terminal devices, and the first node sends the supplementary feedback information to the second node in the mobile communication system through a sidelink. The first node sends the supplementary feedback information to the second node in the mobile communication system through a Physical Sidelink Control Channel (PSCCH) or a Physical Sidelink Shared Channel (PSSCH).

In an embodiment, the first node is the network device, the second node is the terminal device, and the supplementary feedback information is carried in at least one of: Downlink Control Information (DCI), a Physical Downlink Control Channel (PDCCH), a Physical Downlink Shared Channel (PDSCH), a Media Access Control Control Element (MAC CE), a Radio Resource Control (RRC) message, a broadcast message, a Physical Broadcast Channel (PBCH), a System Information Block (SIB), a Master Information Block (MIB), and data information.

In an embodiment, both the first node and the second node are network devices, and the first node transmits the supplementary feedback information on a link between the network devices. The first node sends the supplementary feedback information to the second node in the mobile communication system through an Xn interface.

In the step 606, the second node receives the supplementary feedback information sent by the first node in the mobile communication system.

Exemplarily, the first node is one of the network device and the terminal; and the second node is one of the network device and the terminal.

Accordingly, according to different types of nodes, transmission modes in which the first node sends the supplementary feedback information to the second node are also different, which specifically may be grouped into several optional transmission modes as follows.

In an embodiment, the first node is the terminal device, the second node is the network device, and the supplementary feedback information is carried in at least one of: the UCI, the PUCCH, the PUSCH, the RRC message, and the data information.

In an embodiment, both the first node and the second node are terminal devices, and the second node receives the supplementary feedback information sent by the first node through the sidelink.

In an embodiment, the first node is the network device, the second node is the terminal device, and the supplementary feedback information is carried in at least one of: the DCI, the PDCCH, the PDSCH, the MAC CE, the RRC message, the broadcast message, the PBCH, the SIB, the MIB, and the data information.

In an embodiment, both the first node and the second node are network devices, and the second node receives the supplementary feedback information sent by the first node through the Xn interface.

To sum up, in the method for sending information and the method for receiving information provided by embodiments of the present disclosure, by sending the supplementary feedback information, the first node in the mobile communication system enables the second node to update or predict the complete channel information according to the supplementary feedback information, thereby acquiring new complete channel information. This helps to reduce the feedback overhead while ensuring the CSI feedback effect of the mobile communication system.

Exemplarily, there may be various modes in which the first node feeds back the supplementary feedback information to the second node.

Figure 7:
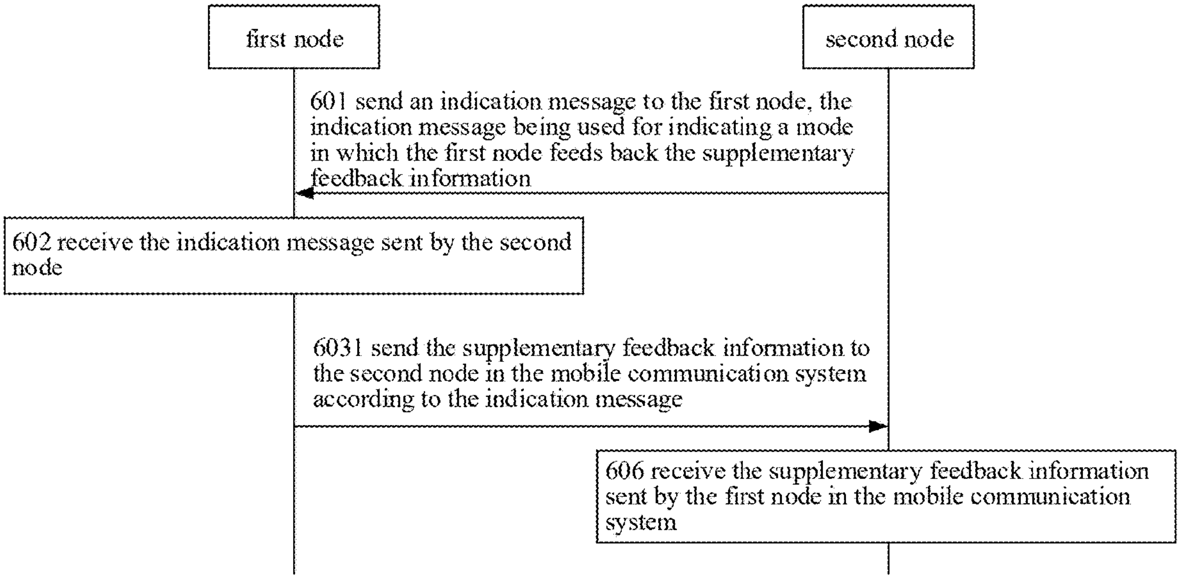
FIG. 7 is a flowchart of an information transmission method provided by an exemplary embodiment of the present disclosure.

FIG. 7 schematically shows a flowchart of an information transmission method provided by an exemplary embodiment of the present disclosure. As shown in FIG. 7, the method includes sending information and receiving information. The above method being applied to a mobile communication system is taken as an example for illustration in embodiments of the present disclosure. The mobile communication system includes a first node and a second node. The method includes the following steps 601, 602 and 6031.

In the step 601, the second node sends an indication message to the first node. The indication message is used for indicating a mode in which the first node feeds back the supplementary feedback information.

Exemplarily, the second node may send, to the first node, configuration information for configuring a CSI feedback mode.

In the step 602, the first node receives the indication message sent by the second node.

In the step 6031, the first node sends the supplementary feedback information to the second node in the mobile communication system according to the indication message.

Exemplarily, there may be various modes in which the first node feeds back the supplementary feedback information. For example, the first node may use at least one of the following modes to feed back the supplementary feedback information.

1) Separate feedback of the supplementary feedback information: a trigger type.
2) Separate feedback of the supplementary feedback information: a periodical type.
3) Feedback of the complete channel information combined with the supplementary feedback information: feedback of the complete channel information and feedback of the supplementary feedback information are separately configured.
4) Feedback of the complete channel information combined with feedback of the supplementary feedback information: feedback of the complete channel information and feedback of the supplementary feedback information are simultaneously configured.

These feedback modes are separately introduced in the following.

1) Separate Feedback of the Supplementary Feedback Information: A Trigger Type.

The indication message includes a first message used for triggering the first node to feed back the supplementary feedback information. The second node sends the first message to the first node; and the first node sends the supplementary feedback information to the second node in the mobile communication system in response to receipt of the first message.

That is, the first message is used for triggering the first node to feed back the supplementary feedback information one or more times.

Figure 8:
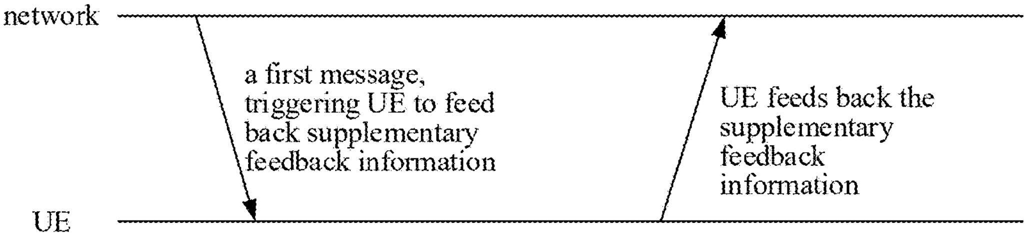
FIG. 8 is a flowchart of an information transmission method provided by an exemplary embodiment of the present disclosure.

For example, as shown in FIG. 8, the first node being a UE and the second node being a network device are taken as an example. The network device sends a first message to the UE for triggering the UE to feed back the supplementary feedback information. The UE feeds back the supplementary feedback information to the network device after receiving the first message.

2) Separate Feedback of the Supplementary Feedback Information: A Periodical Type.

The indication message includes a second message, and the second message includes first configuration information used for configuring the first node to periodically feed back the supplementary feedback information. The second node sends the second message to the first node. The first node periodically sends the supplementary feedback information to the second node in the mobile communication system according to the first configuration information indicated by the second message.

That is, the second message is used for configuring the first node to periodically feed back the supplementary feedback information.

Figure 9:
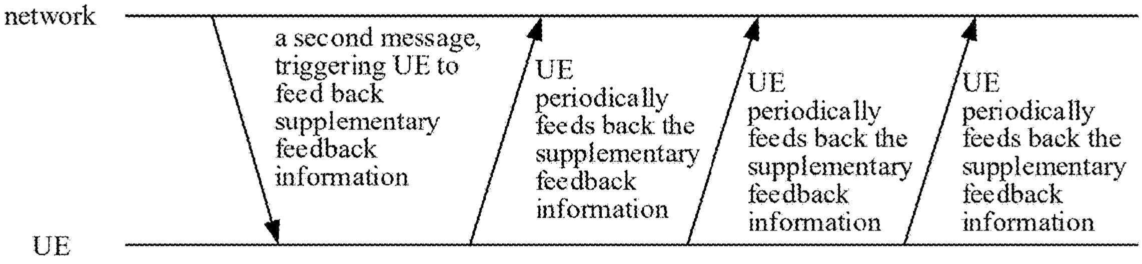
FIG. 9 is a flowchart of an information transmission method provided by an exemplary embodiment of the present disclosure.

For example, as shown in FIG. 9, the first node being a UE and the second node being a network device are taken as an example. The network device sends a second message to the UE for triggering the UE to feed back the supplementary feedback information. The UE periodically feeds back the supplementary feedback information to the network device after receiving the second message.

Exemplarily, the second node may further configure the first node to stop periodical feedback of the supplementary feedback information. The second node sends a third message to the first node. The first node receives the third message sent by the second node. The third message is used for configuring the first node to stop periodical feedback of the supplementary feedback information. In response to receipt of the third message, periodical feedback is stopped of the supplementary feedback information to the second node in the mobile communication system.

Figure 10:
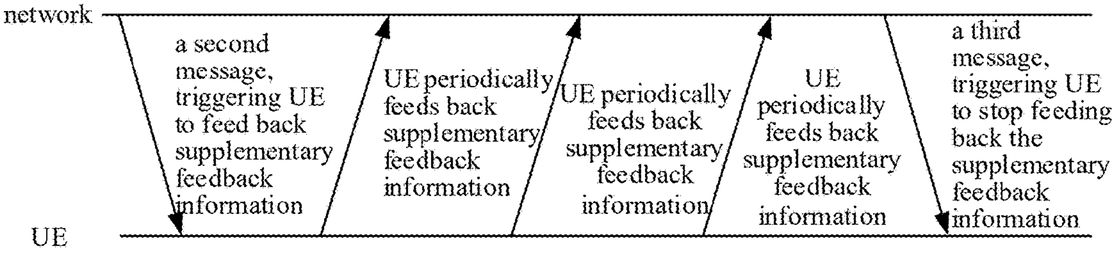
FIG. 10 is a flowchart of an information transmission method provided by an exemplary embodiment of the present disclosure.

For example, as shown in FIG. 10, the first node being a UE and the second node being a network device are taken as an example. The network device sends a second message to the UE for triggering the UE to feed back the supplementary feedback information. The UE periodically feeds back the supplementary feedback information to the network device after receiving the second message. Then, the network device sends the third message to the UE for triggering the UE to stop feeding back the supplementary feedback information.

3) Feedback of the Complete Channel Information Combined with Feedback of the Supplementary Feedback Information: Feedback of the Complete Channel Information and Feedback of the Supplementary Feedback Information are Separately Configured.

Exemplarily, the first node sends the complete channel information to the second node in the mobile communication system. The second node receives the complete channel information sent by the first node in the mobile communication system.

The second node sends a first configuration message to the first node. The first node receives the first configuration message sent by the second node. The first configuration message includes second configuration information used for configuring the first node to periodically feed back the complete channel information. The first node periodically sends the complete channel information to the second node in the mobile communication system according to the second configuration information indicated by the first configuration message.

Figure 11:
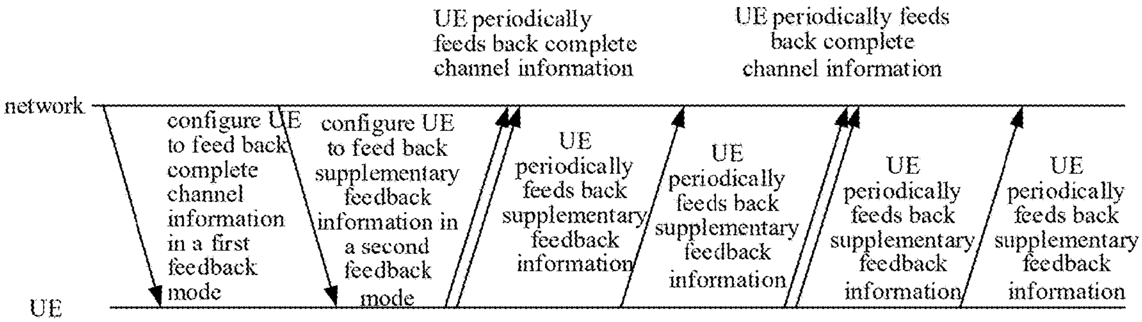
FIG. 11 is a flowchart of an information transmission method provided by an exemplary embodiment of the present disclosure.

For example, as shown in FIG. 11, the first node being a UE and the second node being a network device are taken as an example. The network device sends a first configuration message to the UE, and configures the UE to feed back the complete channel information in a first feedback mode. The network device sends the second message to the UE, and configures the UE to feed back the supplementary feedback information in a second feedback mode. The UE periodically feeds back the complete channel information to the network device according to the first configuration message. The UE periodically feeds back the supplementary feedback information to the network device according to the second message.

Exemplarily, the UE feeds back the complete channel information in the first feedback mode, and the UE feeds back the supplementary feedback information in the second feedback mode. The first feedback mode may be first feedback time domain information (e.g., a feedback period, a feedback time position). The second feedback mode may be second feedback time domain information (e.g., a feedback period, a feedback time position). Exemplarily, the feedback mode for the complete channel information and the feedback mode for the supplementary feedback information are independently configured and independently operate.

Exemplarily, the first node feeds back the supplementary feedback information to the second node according to a first period, and the first node feeds back the complete channel information to the second node according to a second period, where the first period is shorter than the second period.

4) Feedback of the Complete Channel Information Combined with Feedback of the Supplementary Feedback Information: Feedback of the Complete Channel Information and Feedback of the Supplementary Feedback Information are Simultaneously Configured.

The second node sends a second configuration message to the first node, and the first node receives the second configuration message sent by the second node. The second configuration message includes: third configuration information used for configuring the first node to periodically feed back the complete channel information, and fourth configuration information used for configuring the first node to periodically feed back the supplementary feedback information. The first node periodically sends the complete channel information to the second node in the mobile communication system according to the third configuration information indicated by the second configuration message. The first node periodically sends the supplementary feedback information to the second node in the mobile communication system according to the fourth configuration information indicated by the second configuration message. The second node receives the complete channel information periodically sent by the first node according to the third configuration information, where the third configuration information is indicated by the second configuration message.

Figure 12:
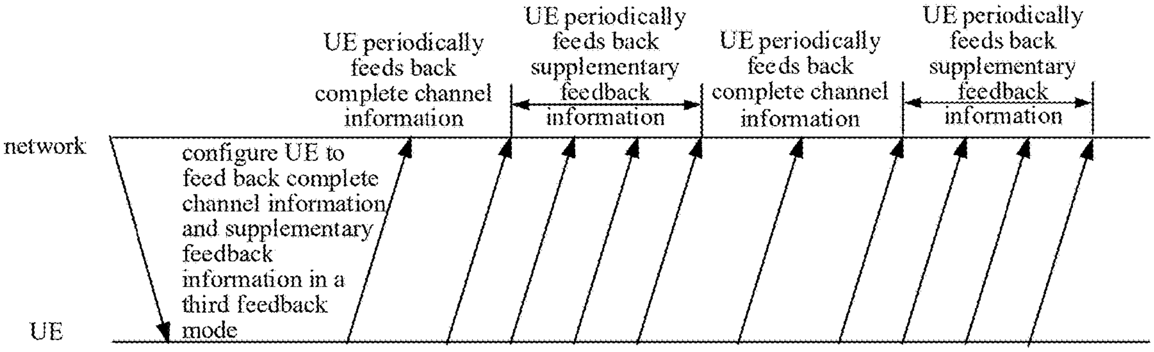
FIG. 12 is a flowchart of an information transmission method provided by an exemplary embodiment of the present disclosure.

For example, as shown in FIG. 12, the first node being a UE and the second node being a network device are taken as an example. The network device sends a second configuration message to the UE, for configuring the UE to feed back the complete channel information and the supplementary feedback information in a third feedback mode. The UE periodically feeds back the complete channel information to the network device according to the second configuration message. The UE periodically feeds back the supplementary feedback information to the network device according to the second configuration message. The second node receives the supplementary feedback information periodically sent by the first node according to the fourth configuration information, wherein the fourth configuration information is indicated by the second configuration message.

The UE feeds back the complete channel information and the supplementary feedback information in the third feedback mode. The third feedback mode may be feedback time domain information and feedback frequency domain information for the complete channel information, feedback time domain information and feedback frequency domain information for the supplementary feedback information, a proportional relationship between the complete channel information and the supplementary feedback information (for example, feeding back the supplementary feedback information N times every time the complete channel information is fed back, where N is a positive integer, such as 1, 2, 3, 4, 5, 6, 7, 8).

Exemplarily, it is needed to configure the aforementioned feedback mode for the supplementary feedback information to the first node, for example, to the UE or to the network device.

When the aforementioned feedback mode for the supplementary feedback information is configured to the UE by another node, and the other node is a network device, the configured mode may be configured through a DCI message, PDCCH channel bearer information, PDSCH channel bearer information, a MAC CE message, a RRC message, a broadcast message, a PBCH, a SIB, a MIB, data information, etc. If the aforementioned feedback mode of the supplementary feedback information is configured to the UE by another node, and the other node is a UE, the configured mode may also be transmitted through a sidelink, through a PSCCH or a PSSCH.

When the aforementioned feedback mode for the supplementary feedback information is configured to the network device by another node, and the other node is a UE, the configured mode may be configured through a UCI message, PUCCH channel bearer information, PUSCH channel bearer information, a RRC message, data information, etc. If the aforementioned feedback mode for the supplementary feedback information is configured to the network device by another node, and the other node is a network device, the configured mode may also be transmitted through a link between network devices, for example, through a link like a Xn interface.

In the step 606, the second node receives the supplementary feedback information sent by the first node in the mobile communication system.

To sum up, in the method provided by embodiments of the present disclosure, the supplementary feedback message is fed back to the second node in a trigger type of feedback mode or in a periodical type of feedback mode, thereby reducing the overhead involved in feeding back CSI from the first node to the second node, and improving the CSI feedback efficiency.

Exemplarily, the supplementary feedback information is acquired by the first node using an encoding model, or the supplementary feedback information is acquired by the first node by mathematically processing the complete channel information. Accordingly, the second node uses a decoding model to decode the supplementary feedback information for acquiring recovery channel information.

Figure 13:
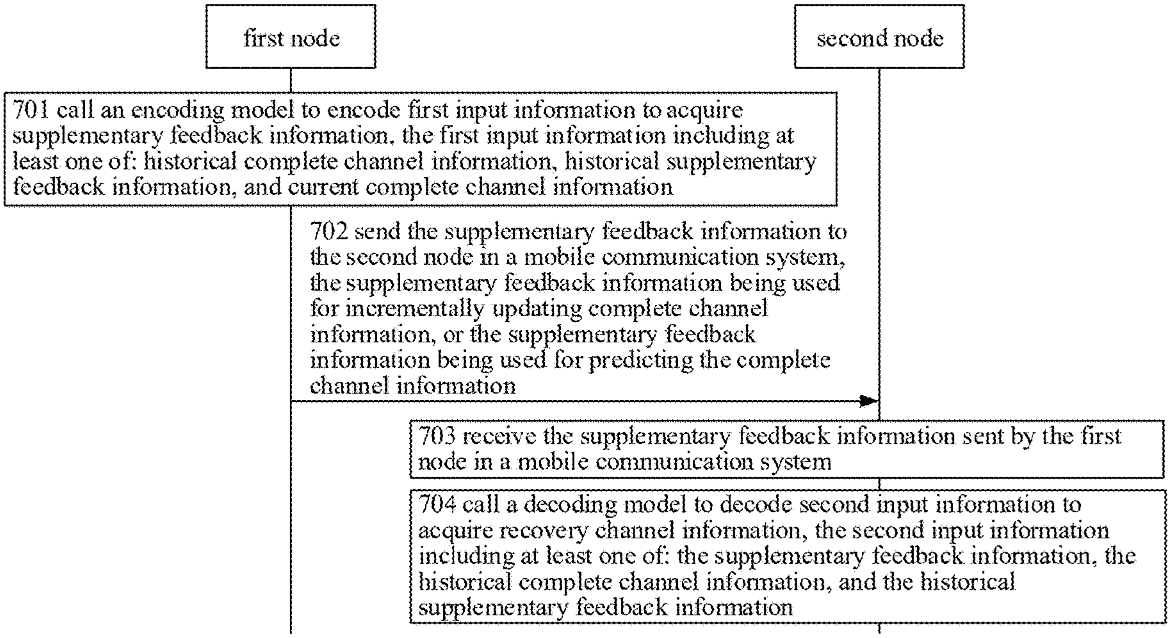
FIG. 13 is a flowchart of an information transmission method provided by an exemplary embodiment of the present disclosure.

FIG. 13 schematically shows a flowchart of an information transmission method provided by an exemplary embodiment of the present disclosure. As shown in FIG. 13, the method includes sending information and receiving information. The above method being applied to a mobile communication system is taken as an example for illustration in embodiments of the present disclosure. The mobile communication system includes a first node and a second node. The method includes the following steps 701 to 704.

In the step 701, the first node calls an encoding model to encode first input information for acquiring the supplementary feedback information. The first input information includes at least one of: historical complete channel information, historical supplementary feedback information, and current complete channel information.

Exemplarily, the encoding model includes a channel state encoding model, and the decoding model includes a channel state information decoding model.

The channel state information encoding model and the channel state information decoding model are used for compressing and recovering relevant information in the channel state information. The channel encoding model and the channel decoding model are used for compressing and recovering relevant information about the channel.

Exemplarily, the first input information may be the current complete channel information; and a prediction for the future complete channel information is output according to the current complete channel information. The first input information may also be the current complete channel information and the historical complete channel information; and an increment in complete channel information or the prediction for the future complete channel information is output according to the current complete channel information and the historical complete channel information. The first input information may also be the current complete channel information and the historical supplementary feedback information; and an increment in complete channel information or the prediction for the future complete channel information is output according to the current complete channel information and the historical supplementary feedback information. The first input information may also be the current complete channel information, the historical complete channel information, and the historical supplementary feedback information; and an increment in complete channel information or the prediction for the future complete channel information is output according to the current complete channel information, the historical complete channel information, and the historical supplementary feedback information.

Exemplarily, the first input information may also be the historical complete channel information; and a prediction for the future complete channel information is output according to the historical complete channel information. Exemplarily, the first input information may also be the historical supplementary feedback information; and the current supplementary feedback information is output according to the historical supplementary feedback information. Exemplarily, the first input information may also be the historical complete channel information and the historical supplementary feedback information; and a prediction for the future complete channel information is output according to the historical complete channel information and the historical supplementary feedback information.

Exemplarily, the encoding model outputs the supplementary feedback information with the feedback overhead of a specific size according to the first input information.

Exemplarily, the supplementary feedback information has a construction mode such as a specific information length, mapping rule, quantization rule, and normalization processing mode. The construction mode for the supplementary feedback information may be notified to the first node or the second node through signaling transmission.

For example, the second node sends a first signaling to the first node, and the first signaling is used for indicating the construction mode for the supplementary feedback information. The first node receives the first signaling sent by the second node, and calls an encoding model corresponding to the first signaling for encoding the first input information, so that the supplementary feedback information is acquired. The second node calls a decoding model corresponding to the first signaling to decode the second input information, so that the recovery channel information is acquired.

For example, the first node sends a second signaling to the second node, and calls an encoding model corresponding to the second signaling for encoding the first input information, so that the supplementary feedback information is acquired. The second node receives the second signaling sent by the first node. The second signaling is used for indicating the construction mode for the supplementary feedback information. The second node calls a decoding model corresponding to the second signaling to decode the second input information, so that the recovery channel information is acquired.

Exemplarily, the first node may also perform mathematical processing on the complete channel information to acquire the supplementary feedback information. For example, the mathematical processing may be operations such as decomposition and projection in a specific space. The second node uses a decoder to decode the supplementary feedback information for acquiring the recovery channel information.

In the step 702, the first node sends the supplementary feedback information to the second node in the mobile communication system. The supplementary feedback information is used for incrementally updating the complete channel information, or the supplementary feedback information is used for predicting the complete channel information.

In the step 703, the second node receives the supplementary feedback information sent by the first node in the mobile communication system.

In the step 704, the second node calls a decoding model to decode the second input information for acquiring the recovery channel information. The second input information includes at least one of: the supplementary feedback information, historical complete channel information, and historical supplementary feedback information.

Exemplarily, after receiving the supplementary feedback information, the second node may input the supplementary feedback information into the decoding model for decoding, so that the recovery channel information is acquired. Exemplarily, the second node may also input the supplementary feedback information along with at least one of the historical complete channel information as historically received and the historical supplementary feedback information as historically received into the decoding model for decoding. Exemplarily, the second input information at least includes the supplementary feedback information.

Exemplarily, the recovery channel information may be the complete channel information, or the increment in complete channel information. That is, the recovery channel information may be the complete channel information at the current time, or the predicted complete channel information at a future time. The recovery channel information may also be an increment of the complete channel information at the current time compared with the complete channel information at a previous time, or an increment of the complete channel information at a future time compared with the complete channel information at the current time.

For example, the first node measures the complete channel information at time t, and then acquires the supplementary feedback information according to the complete channel information at time t. After receiving the supplementary feedback information, the second node calls the decoder for decoding, so that the complete channel information at time t, or the complete channel information at time t+1, or the increment of the complete channel information at time t relative to the complete channel information at time t−1, or the increment of the complete channel information at time t+1 relative to the complete channel information at time t is acquired.

To sum up, in the method provided by embodiments of the present disclosure, the supplementary feedback information is acquired by using the encoder according to the measured complete channel information, the historical complete channel information, or the historical supplementary feedback information, thereby reducing the data amount involved in CSI feedback. After receiving the supplementary feedback information, the second node uses the decoder to decode the supplementary feedback information, so that the recovery channel information is acquired. Thus, the second node can update the complete channel information according to a small amount of supplementary feedback information, thereby improving the CSI feedback efficiency.

In the method provided by embodiments of the present disclosure, an AI-based solution processes and uses the encoding model and the decoding model to acquire the channel information, and determines the channel quality condition by a method such as incrementally updating the channel information and predicting the channel information. This help to further reduce the feedback overhead of the system channel information.

Exemplarily, method steps in the foregoing various embodiments may be implemented independently to form one embodiment, and may also be combined arbitrarily to form a new embodiment.

Figure 14:
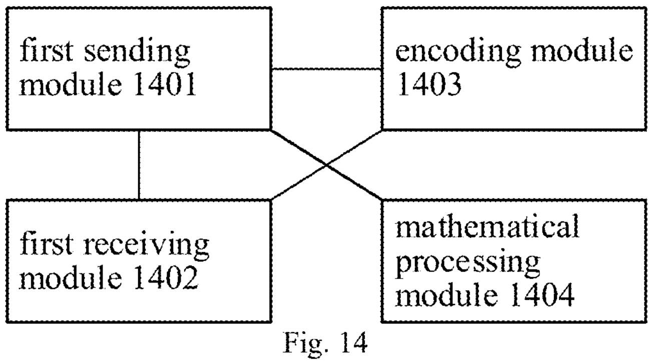
FIG. 14 is a schematic structural diagram of an apparatus for sending information provided by an exemplary embodiment of the present disclosure.

FIG. 14 shows a structural block diagram of an apparatus for sending information provided by an exemplary embodiment of the present disclosure. The apparatus may be implemented as a terminal device, or may be implemented as a part of the terminal device. The apparatus is applied to a first node in a communication system, and includes:

- a first sending module 1401, configured to send supplementary feedback information to a second node in the mobile communication system, where the supplementary feedback information is used for incrementally updating complete channel information, or the supplementary feedback information is used for predicting the complete channel information.

In an optional design of the present disclosure, the apparatus further includes:

- a first receiving module 1402, configured to receive an indication message sent by the second node, where the indication message is used for indicating a mode in which the first node feeds back the supplementary feedback information.

The first sending module 1401 is configured to send the supplementary feedback information to the second node in the mobile communication system according to the indication message.

In an optional design of the present disclosure, the indication message includes a first message, and the first message is used for triggering the first node to feed back the supplementary feedback information.

The first sending module 1401 is configured to send the supplementary feedback information to the second node in the mobile communication system in response to receiving the first message.

In an optional design of the present disclosure, the indication message includes a second message, and the second message includes first configuration information used for configuring the first node to periodically feed back the supplementary feedback information.

The first sending module 1401 is configured to periodically send the supplementary feedback information to the second node in the mobile communication system according to the first configuration information indicated by the second message.

In an optional design of the present disclosure, the apparatus further includes:

- the first sending module 1401, configured to stop periodical sending of the supplementary feedback information to the second node in the mobile communication system in response to receipt of the third message.

In an optional design of the present disclosure, the first sending module 1401 is configured to send the complete channel information to the second node in the mobile communication system.

In an optional design of the present disclosure, the apparatus further includes:

- a first receiving module 1402, configured to receive a first configuration message sent by the second node, where the first configuration message includes second configuration information used for configuring the first node to periodically feed back the complete channel information; and
- the first sending module 1401, configured to periodically send the complete channel information to the second node in the mobile communication system according to the second configuration information indicated by the first configuration message.

In an optional design of the present disclosure, the first node feeds back the supplementary feedback information to the second node according to a first period, and the first node feeds back the complete channel information to the second node according to a second period, where the first period is shorter than the second period.

In an optional design of the present disclosure, the apparatus further includes:

- a first receiving module 1402, configured to receive a second configuration message sent by the second node, where the second configuration message includes: third configuration information used for configuring the first node to periodically feed back the complete channel information, and fourth configuration information used for configuring the first node to periodically feed back the supplementary feedback information; and
- a first sending module 1401, configured to periodically send the complete channel information to the second node in the mobile communication system according to the third configuration information indicated by the second configuration message.

The first sending module 1401 is configured to periodically send the supplementary feedback information to the second node in the mobile communication system according to the fourth configuration information indicated by the second configuration message.

In an optional design of the present disclosure, the apparatus further includes:

- an encoding module 1403, configured to call an encoding model to encode first input information for acquiring the supplementary feedback information, where the first input information includes at least one of historical complete channel information, historical supplementary feedback information, and current complete channel information.

In an optional design of the present disclosure, the apparatus further includes:

- a first receiving module 1402, configured to receive a first signaling sent by the second node, where the first signaling is used for indicating a construction mode for the supplementary feedback information; and an encoding module 1403, configured to call the encoding model corresponding to the first signaling to encode the first input information so that the supplementary feedback information is acquired.

In an optional design of the present disclosure, the construction mode for the supplementary feedback information includes at least one of an information length, a mapping rule, a quantization rule, and a normalization processing mode.

In an optional design of the present disclosure, the first sending module 1401 is configured to send a second signaling to the second node, where the second signaling is used for indicating a construction mode for the supplementary feedback information.

In an optional design of the present disclosure, the apparatus further includes:

a mathematical processing module 1404, configured to perform mathematical processing on the complete channel information to acquire the supplementary feedback information.

In an optional design of the present disclosure, the first node is a terminal device, the second node is a network device, and the supplementary feedback information is carried in at least one of:

Uplink Control Information (UCI), a Physical Uplink Control Channel (PUCCH), a Physical Uplink Shared Channel (PUSCH), a RRC message, and data information.

In an optional design of the present disclosure, both the first node and the second node are terminal devices; and the first sending module 1401 is configured to send the supplementary feedback information to the second node in the mobile communication system through a sidelink.

In an optional design of the present disclosure, the first node is a network device, the second node is a terminal device, and the supplementary feedback information is carried in at least one of:

Downlink Control Information (DCI), a Physical Downlink Control Channel (PDCCH), a Physical Downlink Shared Channel (PDSCH), a Media Access Control Control Element (MAC CE), a RRC message, a broadcast message, a Physical Broadcast Channel (PBCH), a System Information Block (SIB), a Master Information Block (MIB), and data information.

In an optional design of the present disclosure, both the first node and the second node are network devices; and the first sending module 1401 is configured to send the supplementary feedback information to the second node in the mobile communication system through an Xn interface.

Figure 15:
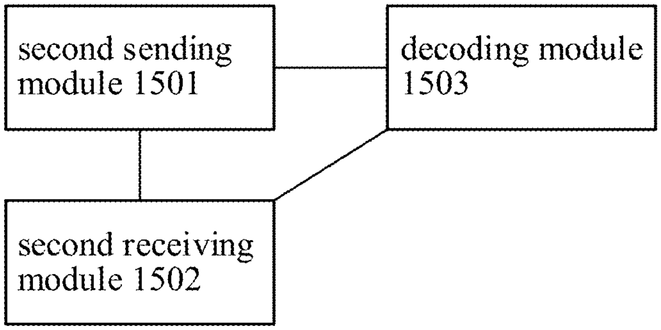
FIG. 15 is a schematic structural diagram of an apparatus for receiving information provided by an exemplary embodiment of the present disclosure.

FIG. 15 shows a structural block diagram of an apparatus for receiving information provided by an exemplary embodiment of the present disclosure. The apparatus may be implemented as a terminal device, or may be implemented as a part of the terminal device. The apparatus is applied to a second node in a communication system, and includes:

a second receiving module 1502, configured to receive supplementary feedback information sent by a first node in the mobile communication system, where the supplementary feedback information is used for incrementally updating complete channel information, or the supplementary feedback information is used for predicting the complete channel information.

In an optional design of the present disclosure, the apparatus further includes:

a second sending module 1501, configured to send an indication message to the first node, where the indication message is used for indicating a mode in which the first node feeds back the supplementary feedback information.

In an optional design of the present disclosure, the second sending module 1501 is configured to send a first message to the first node, where the first message is used for triggering the first node to feed back the supplementary feedback information.

In an optional design of the present disclosure, the second sending module 1501 is configured to send a second message to the first node, where the second message includes first configuration information used for configuring the first node to periodically feed back the supplementary feedback information.

In an optional design of the present disclosure, the second sending module 1501 is configured to send a third message to the first node, where the third message is used for configuring the first node to stop periodical feedback of the supplementary feedback information.

In an optional design of the present disclosure, the second receiving module 1502 is configured to receive the complete channel information sent by the first node in the mobile communication system.

In an optional design of the present disclosure, the apparatus further includes:

a second sending module 1501, configured to send a first configuration message to the first node, where the first configuration message includes second configuration information used for configuring the first node to periodically feed back the complete channel information.

In an optional design of the present disclosure, the first node feeds back the supplementary feedback information to the second node according to a first period, and the first node feeds back the complete channel information to the second node according to a second period, where the first period is shorter than the second period.

In an optional design of the present disclosure, the apparatus further includes:

the second sending module 1501, configured to send a second configuration message to the first node, where the second configuration message includes: third configuration information used for configuring the first node to periodically feed back the complete channel information, and fourth configuration information used for configuring the first node to periodically feed back the supplementary feedback information;

the second receiving module 1502, configured to receive the complete channel information periodically sent by the first node according to the third configuration information, where the third configuration information is indicated by the second configuration message; and the second receiving module 1502, configured to receive the supplementary feedback information periodically sent by the first node according to the fourth configuration information, where the fourth configuration information is indicated by the second configuration message.

In an optional design of the present disclosure, the apparatus further includes:

a decoding module 1503, configured to call a decoding model to decode second input information for acquiring recovery channel information, where the second input information includes at least one of: the supplementary feedback information, historical complete channel information, and historical supplementary feedback information.

In an optional design of the present disclosure, the apparatus further includes:

the second sending module 1501, configured to send a first signaling to the first node, where the first signaling is used for indicating a construction mode for the supplementary feedback information; and the decoding module 1503, configured to call the decoding model corresponding to the first signaling for decoding the second input information so that the recovery channel information is acquired.

In an optional design of the present disclosure, the construction mode for the supplementary feedback information includes at least one of: an information length, a mapping rule, a quantization rule, and a normalization processing mode.

In an optional design of the present disclosure, the second receiving module 1502 is configured to receive a second signaling sent by the first node, where the second signaling is used for indicating a construction mode for the supplementary feedback information; and the decoding module 1503 is configured to call the decoding model corresponding to the second signaling for decoding the second input information so that the recovery channel information is acquired.

In an optional design of the present disclosure, the first node is a terminal device, the second node is a network device, and the supplementary feedback information is carried in at least one of:

Uplink Control Information (UCI), a Physical Uplink Control Channel (PUCCH), a Physical Uplink Shared Channel (PUSCH), a RRC message, and data information.

In an optional design of the present disclosure, both the first node and the second node are terminal devices; and the second receiving module 1502 is configured to receive the supplementary feedback information sent by the first node through a sidelink.

In an optional design of the present disclosure, the first node is a network device, the second node is a terminal device, and the supplementary feedback information is carried in at least one of:

Downlink Control Information (DCI), a Physical Downlink Control Channel (PDCCH), a Physical Downlink Shared Channel (PDSCH), a Media Access Control Control Element (MAC CE), a RRC message, a broadcast message, a Physical Broadcast Channel (PBCH), a System Information Block (SIB), a Master Information Block (MIB), and data information.

In an optional design of the present disclosure, both the first node and the second node are network devices; and the second receiving module 1502 is configured to receive the supplementary feedback information sent by the first node through an Xn interface.

Figure 16:
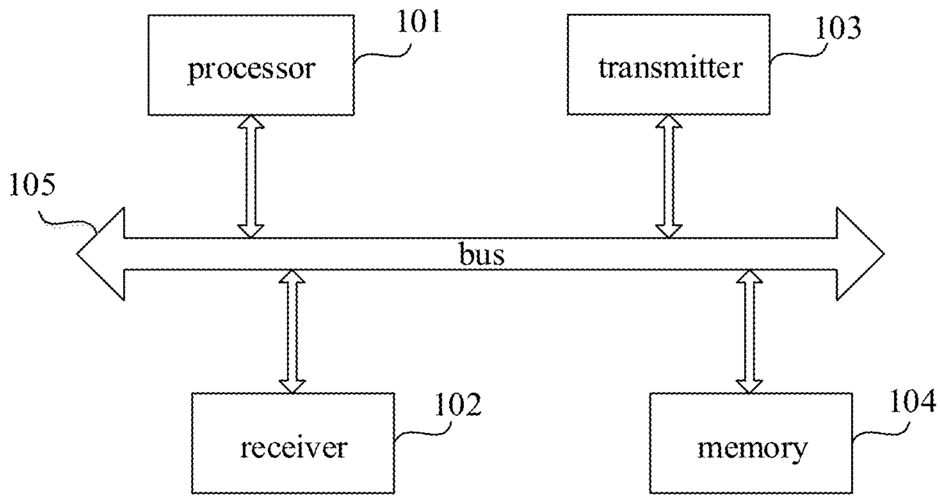
FIG. 16 is a block diagram of a communication device provided by an exemplary embodiment of the present disclosure.

FIG. 16 shows a schematic structural diagram of a communication device (a terminal or a network device) provided by an exemplary embodiment of the present disclosure. The communication device includes: a processor 101, a receiver 102, a transmitter 103, a memory 104, and a bus 105.

The processor 101 includes one or more processing cores. The processor 101 runs a software program and a module to execute various functional applications and perform information processing.

The receiver 102 and the transmitter 103 may be implemented as one communications component. The communications component may be a communications chip.

The memory 104 is connected to the processor 101 through the bus 105.

The memory 104 may be configured to store at least one instruction. The processor 101 is configured to execute the at least one instruction, to perform various steps of the method for determining the RAR reception window mentioned in the foregoing method embodiments.

In addition, the memory 104 may be implemented by a volatile or non-volatile storage device of any type or a combination thereof. The volatile or non-volatile storage device includes but is not limited to: a magnetic disk or an optical disc, an Electrically-Erasable Programmable Read Only Memory (EEPROM), an Erasable Programmable Read Only Memory (EPROM), a Static Random Access Memory (SRAM), a Read-Only Memory (ROM), a magnetic memory, a flash memory, or a Programmable Read-Only Memory (PROM).

In an exemplary embodiment, there is further provided a terminal, including: a processor, a transceiver connected to the processor, and a memory configured to store executable instructions for the processor. The processor is configured to load and execute the executable instructions to perform the method for sending information and/or the method for receiving information as described in the above aspects.

In an exemplary embodiment, there is further provided a network device, including: a processor, a transceiver connected to the processor, and a memory configured to store executable instructions for the processor. The processor is configured to load and execute the executable instructions to perform the method for sending information and/or the method for receiving information as described in the above aspects.

In an exemplary embodiment, there is further provided a computer-readable storage medium having executable instructions stored thereon. The executable instructions are loaded and executed by a processor to perform the method for sending information and/or the method for receiving information as described in the above aspects.

In an exemplary embodiment, there is further provided a chip, including a programmable logic circuit or a program. The chip is configured to implement the method for sending information and/or the method for receiving information as described in the above aspects.

In an exemplary embodiment, there is further provided a computer program product. The computer program product, when running on a processor of a computer device, causes the computer device to perform the method for sending information and/or the method for receiving information as described in the above aspects.

A person of ordinary skill in the art can understand that all or part of the steps in the above embodiments can be implemented by hardware, or by a program to instruct relevant hardware to complete. The program may be stored in a computer-readable storage medium. The above-mentioned storage medium may be a read-only memory, a magnetic disk, or an optical disk.

The foregoing descriptions are only optional embodiments of the present application and are not intended to limit the present application. Any modification, equivalent replacement, improvement, and the like made within the spirit and principle of the present application shall be included in the protection scope of the present application.

What is claimed is:

1. A method for sending information, applied to a first node in a mobile communication system, and comprising:

receiving an indication message sent by a second node in the mobile communication system, wherein the indication message is used for indicating a mode in which the first node feeds back a supplementary feedback information; and sending the supplementary feedback information to the second node in the mobile communication system according to the indication message;

wherein the supplementary feedback information is used for incrementally updating complete channel information, or the supplementary feedback information is used for predicting the complete channel information;

wherein the complete channel information is used for describing a channel quality condition about a channel;

wherein the indication message comprises a second message, the second message comprising first configuration information used for configuring the first node to periodically feed back the supplementary feedback information;

wherein sending the supplementary feedback information to the second node in the mobile communication system according to the indication message comprises:

periodically sending the supplementary feedback information to the second node in the mobile communication system according to the first configuration information indicated by the second message; and wherein the method further comprises:

receiving a third message sent by the second node, wherein the third message is used for configuring the first node to stop periodical feedback of the supplementary feedback information;

stopping periodical sending of the supplementary feedback information to the second node in the mobile communication system in response to receipt of the third message;

sending the complete channel information to the second node in the mobile communication system; and receiving a first configuration message sent by the second node, wherein the first configuration message comprises second configuration information used for configuring the first node to periodically feed back the complete channel information:

wherein sending the complete channel information to the second node in the mobile communication system comprises:

periodically sending the complete channel information to the second node in the mobile communication system according to the second configuration information indicated by the first configuration message:

wherein the supplementary feedback information is fed back to the second node by the first node according to a first period, and the complete channel information is fed back to the second node by the first node according to a second period, the first period being shorter than the second period.

2. The method according to claim 1, wherein:

the indication message further comprises a first message, the first message being used for triggering the first node to feed back the supplementary feedback information; and sending the supplementary feedback information to the second node in the mobile communication system according to the indication message further comprises:

sending the supplementary feedback information to the second node in the mobile communication system in response to receipt of the first message.

3. The method according to claim 1, further comprising:

receiving a second configuration message sent by the second node, wherein the second configuration message comprises: third configuration information used for configuring the first node to periodically feed back the complete channel information, and fourth configuration information used for configuring the first node to periodically feed back the supplementary feedback information; and periodically sending the complete channel information to the second node in the mobile communication system according to the third configuration information indicated by the second configuration message;

wherein sending the supplementary feedback information to the second node in the mobile communication system comprises:

periodically sending the supplementary feedback information to the second node in the mobile communication system according to the fourth configuration information indicated by the second configuration message.

4. The method according to claim 1, further comprising:

acquiring the supplementary feedback information by calling an encoding model to encode first input information, wherein the first input information comprises at least one of: historical complete channel information, historical supplementary feedback information, and current complete channel information.

5. The method according to claim 4, further comprising:

receiving a first signaling sent by the second node, wherein the first signaling is used for indicating a construction mode for the supplementary feedback information;

wherein acquiring the supplementary feedback information by calling the encoding model to encode the first input information comprises:

calling the encoding model corresponding to the first signaling to encode the first input information so that the supplementary feedback information is acquired.

6. The method according to claim 5, wherein the construction mode for the supplementary feedback information comprises at least one of: an information length, a mapping rule a quantization rule, and a normalization processing mode.

7. The method according to claim 4, further comprising:

sending a second signaling to the second node, wherein the second signaling is used for indicating a construction mode for the supplementary feedback information.

8. The method according to claim 1, further comprising:

performing mathematical processing on the complete channel information to acquire the supplementary feedback information.

9. The method according to claim 1, wherein the first node is a terminal device, the second node is a network device, and the supplementary feedback information is carried in at least one of:

Uplink Control Information (UCI), a Physical Uplink Control Channel (PUCCH), a Physical Uplink Shared Channel (PUSCH), a Radio Resource Control (RRC) message, and data information.

10. The method according to claim 1, wherein:

both the first node and the second node are terminal devices, and wherein sending the supplementary feedback information to the second node in the mobile communication system comprises:

sending the supplementary feedback information to the second node in the mobile communication system through a sidelink.

11. A first device, comprising:

a processor, a transceiver connected to the processor, and a memory configured to store executable instructions for the processor;

wherein the processor is configured to load and execute the executable instructions to perform a method for sending information, comprising:

receiving an indication message sent by a second device in a mobile communication system, wherein the indication message is used for indicating a mode in which the first device feeds back a supplementary feedback information; and sending the supplementary feedback information to the second device in the mobile communication system according to the indication message;

wherein the supplementary feedback information is used for incrementally updating complete channel information, or the supplementary feedback information is used for predicting the complete channel information;

wherein the complete channel information is used for describing a channel quality condition about a channel;

wherein the indication message comprises a second message, the second message comprising first configuration information used for configuring the first device to periodically feed back the supplementary feedback information;

wherein sending the supplementary feedback information to the second device in the mobile communication system according to the indication message comprises:

periodically sending the supplementary feedback information to the second device in the mobile communication system according to the first configuration information indicated by the second message; and wherein the method further comprises:

receiving a third message sent by the second device, wherein the third message is used for configuring the first device to stop periodical feedback of the supplementary feedback information;

stopping periodical sending of the supplementary feedback information to the second device in the mobile communication system in response to receipt of the third message;

sending the complete channel information to a second node in the mobile communication system; and receiving a first configuration message sent by the second node, wherein the first configuration message comprises second configuration information used for configuring the first node to periodically feed back the complete channel information:

wherein sending the complete channel information to the second node in the mobile communication system comprises:

periodically sending the complete channel information to the second node in the mobile communication system according to the second configuration information indicated by the first configuration message:

wherein the supplementary feedback information is fed back to the second node by the first node according to a first period, and the complete channel information is fed back to the second node by the first node according to a second period, the first period being shorter than the second period.

12. A second device, comprising:

a processor, a transceiver connected to the processor, and a memory configured to store executable instructions for the processor;

wherein the processor is configured to load and execute the executable instructions to perform a method for receiving information, comprising:

sending an indication message to a first device in a mobile communication system, wherein the indication message is used for indicating a mode in which the first device feeds back a supplementary feedback information; and receiving the supplementary feedback information sent by the first device in the mobile communication system according to the indication message, wherein the supplementary feedback information is used for incrementally updating complete channel information, or the supplementary feedback information is used for predicting the complete channel information;

wherein the complete channel information is used for describing a channel quality condition about a channel;

wherein sending the indication message to the first device comprises:

sending a second message to the first device, wherein the second message comprises first configuration information used for configuring the first device to periodically feed back the supplementary feedback information;

wherein the supplementary feedback information is periodically sent by the first device in the mobile communication system according to the first configuration information indicated by the second message;

wherein the method further comprises:

sending a third message to the first device, wherein the third message is used for configuring the first device to stop periodical feedback of the supplementary feedback information;

receiving the complete channel information from the first node in the mobile communication system; and sending a first configuration message to the first node, wherein the first configuration message comprises second configuration information used for configuring the first node to periodically feed back the complete channel information, wherein receiving the complete channel information from the first node in the mobile communication system comprises:

periodically receiving the complete channel information from the first node in the mobile communication system according to the second configuration information indicated by the first configuration message:

wherein the supplementary feedback information is fed back to a second node by the first node according to a first period, and the complete channel information is fed back to the second node by the first node according to a second period, the first period being shorter than the second period; and wherein periodical sending of the supplementary feedback information by the first device in the mobile communication system is stopped in response to receipt of the third message.

13. The second device according to claim 12, wherein sending the indication message to the first device further comprises:

sending a first message to the first device, wherein the first message is used for triggering the first device to feed back the supplementary feedback information.

* * * * *